United States Patent [19]

Fünfschilling et al.

[11] Patent Number: 5,818,548
[45] Date of Patent: Oct. 6, 1998

[54] FERROELECTRIC LIQUID CRYSTAL DISPLAY IN WHICH THE SWITCHING ANGLE DOES NOT EXCEED ± 22.5°

[75] Inventors: Jürg Fünfschilling, Basle; Martin Schadt, Seltisberg, both of Switzerland

[73] Assignee: Rolic AG, Zug, Switzerland

[21] Appl. No.: 736,865

[22] Filed: Oct. 25, 1996

[30] Foreign Application Priority Data

Nov. 7, 1995 [CH] Switzerland ............................. 3143/95

[51] Int. Cl.⁶ .......................... G02F 1/133; G02F 1/1347; C09K 19/02
[52] U.S. Cl. ................................ 349/33; 349/74; 349/172
[58] Field of Search ................................. 349/74, 77, 81, 349/172, 33

[56] References Cited

U.S. PATENT DOCUMENTS

| | | | |
|---|---|---|---|
| 4,099,855 | 7/1978 | Wisbey et al. | 349/33 |
| 5,126,894 | 6/1992 | Akiyama et al. | |
| 5,477,354 | 12/1995 | Schehrer | 349/74 |

FOREIGN PATENT DOCUMENTS

| | | |
|---|---|---|
| 309774 | 9/1988 | European Pat. Off. |
| 2 644 596 | 9/1990 | France |
| WO 95/10794 | 4/1995 | WIPO |

Primary Examiner—William L. Sikes
Assistant Examiner—Walter Malinowski
Attorney, Agent, or Firm—Bryan Cave LLP

[57] ABSTRACT

A ferroelectric liquid crystal display comprises two liquid crystal cells disposed one behind the other between two polarizers, one cell having line electrodes and the other having pixel electrodes. The pixel electrodes are driven with image information in synchronism with the line electrodes. The orientation and refractive index of the liquid crystal cells are so chosen that transmission is not substantially altered when the control voltages are reversed. The two displays are so actuated that the switching angle never exceeds ±22.5°. The polarity of the voltages is periodically so inverted that on average there is no DC voltage across the cells.

2 Claims, 3 Drawing Sheets

FIG. 3

| | AMPLITUDE | PHASE 1 | | PHASE 2 | |
|---|---|---|---|---|---|
| | | 41 CONSTANT | 42 VARIABLE | 43 CONSTANT | 44 VARIABLE |
| 45 | LIGHT | | | | |
| | VOLTAGE | -U1 | U1 | U1 | -U1 |
| 46 | GREY | | | | |
| | VOLTAGE | -U1 | U2 | U1 | -U2 |
| 47 | DARK | | | | |
| | VOLTAGE | -U1 | -U1 | U1 | U1 |

| | AMPLITUDE | PHASE 1 | | PHASE 2 | |
|---|---|---|---|---|---|
| | | 31 CONSTANT | 32 VARIABLE | 33 CONSTANT | 34 VARIABLE |
| 35 | LIGHT |  |  |  |  |
| | VOLTAGE | -U1 | U1 | U1 | -U1 |
| 36 | GREY |  |  |  |  |
| | VOLTAGE | -U1 | U2 | U1 | -U2 |
| 37 | DARK |  |  |  |  |
| | VOLTAGE | -U1 | -U1 | U1 | U1 |

ND DOES NOT EXCEED ± 22.5°

FIELD OF THE INVENTION

The invention relates to ferroelectric liquid crystal displays.

BACKGROUND OF THE INVENTION

Ferroelectric liquid crystal displays, more particularly of the DHF (deformed helix ferroelectric) type, are an attractive alternative to conventional TN (twisted nematic) or STN (super-twisted nematic) displays, particularly when large angles of view, grey tints or short switching times are required, e.g. when operating at low temperatures.

The operation of ferroelectric liquid crystal displays is known (See for example, in EP-A-309 774, corresponding to U.S. patent application Ser. No. 08/496,610, the contents of which are herein incorporated by reference). If operated in "symmetrical" mode, they have the disadvantage of a large switching angle of ±45°, necessary for maximum transmission. Mixtures with a large switching angle are difficult to produce and generally slower than mixtures with a small switching angle. They also tend to wind up the helix before the maximum switching angle is reached. Hitherto there have been no liquid crystal materials with an optimum switching angle, that is, optimum lightness in symmetrical mode. On the other hand, if they are operated in "asymmetrical" mode, one disadvantage is that no use can be made of the alternating polarity of the individual images. If, for example, the displays have to remain dark for a long period, a negative voltage must be applied during all this time. This results in space charges in the liquid crystal and at the boundary surfaces. The space charges alter the electro-optical characteristic, which can result in ghost images and similar, very disturbing effects, which may make the display useless.

The object of the invention is to provide a ferroelectric liquid crystal display which does not have the disadvantages of previously known displays of this kind.

SUMMARY OF THE INVENTION

The invention relates to a ferroelectric liquid crystal display. The display comprises two polarizers, and two liquid crystal cells capable of transmitting light, disposed one behind the other between the two polarizers. Each liquid crystal cell comprises two transparent substrates, two transparent electrodes and a liquid crystal layer displayed between the two transparent electrodes. Each transparent electrode is fitted to a transparent substrate. One electrode of one of the liquid crystal cells is a line electrode and one electrode of the other of the liquid crystal cells is a pixel electrode. The liquid crystal layer has a helical structure which is influenced by the action of an electric potential. The helix has its axis parallel to the transparent substrates at an electric potential of 0 V and, upon application of a positive or a negative electrical potential, a major axis of a refractive index ellipsoid. Upon application of the positive or the negative electrical potential, the angle between the axis of the helix and the major axis of the refractive index ellipsoid never exceeds ±22.5°. Substantially the same light transmission is obtained for each liquid crystal cell upon application, at the same time, of a positive electric potential of a given valve to one of the liquid crystal cells and a negative electric potential of equal value to the other liquid crystal cell.

BRIEF DESCRIPTION OF THE DRAWINGS

Preferred exemplified embodiments of the invention will now be described with reference to the accompanying drawings, in which:

FIG. 3 shows the orientation and double refraction properties of the cell arrangement shown in FIG. 2.

DETAILED DESCRIPTION OF THE INVENTION

According to the invention, the object of the invention is achieved by two liquid crystal cells disposed one behind the other between two polarizers, one cell having line electrodes and the other having pixel electrodes, and by means for actuating the pixel electrodes with image information in synchronism with the line electrodes, the orientation and refractive index of the liquid crystal cells being so chosen that transmission is not substantially altered when the control voltages are reversed, and the two displays being so actuated that the switching angle never exceeds ±22.5° and the polarity of the voltages is periodically so inverted that on average there is no DC voltage across the cells.

The subject invention will now be described in terms of its preferred embodiments. These embodiments are set forth to aid in understanding the invention, but are not to be construed as limiting.

Figure 1:
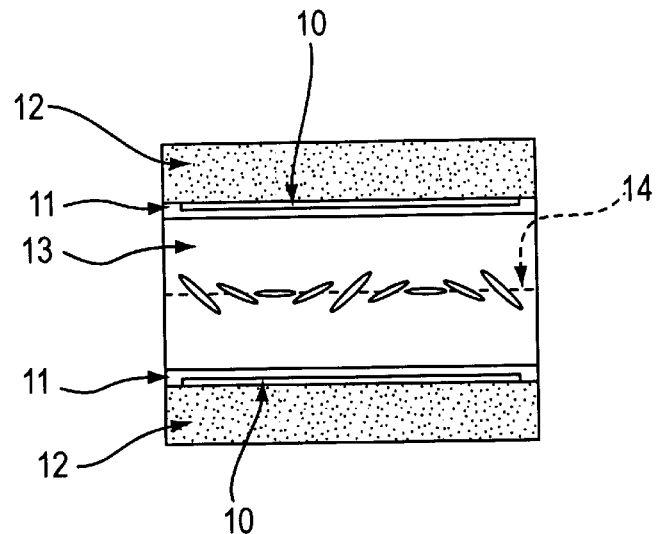
FIG. 1 is a sectional diagram through a conventional DHF cell.

As FIG. 1 shows, a conventional DHF cell comprises two glass plates 12 fitted with transparent electrodes 10 and orientation layers 11 and about 2 μm apart. A liquid crystal layer 13 is disposed in between. The liquid crystal has a ferroelectric "Sc*" phase with a helical structure. The axis 14 of the helix is parallel to the plates and the pitch is shorter than the wavelength of visible light. If no voltage is applied, the helix is not deformed and the average refractive index points towards the axis of the helix. If a voltage is applied between the two electrodes, the average refractive index (that is, the long or major axis of the refractive index ellipsoid) rotates in the plane of the glass plates, in one direction for positive and in the opposite direction for negative voltages. If the voltage is progressively increased, the angle becomes saturated at a maximum switching angle $q_{max}$ which is characteristic for the ferroelectric liquid crystal. At saturation, the helix is wound up. If the voltage is lowered, the helix re-forms. This process, however, may take some time, so that winding up of the helix is usually avoided in DHF cells. This means, however, that the maximum usable angle of rotation must be chosen less than $q_{max}$.

If a DHF cell is placed between crossed polarizers, the light transmission alters as a result of the rotation of the refractive index. It can be shown that a rotation of 45° is necessary for switching from maximum lightness to darkness. In the dark state, the optical axis is parallel to one of the polarizers, whereas in the light state it is rotated 45° therefrom. As already explained, a DHF display can be operated in two different modes which differ with respect to the angle q(0) between the optical major axis and one of the polarizers at an applied voltage of 0 V as follows:

In the symmetrical mode, an applied voltage of U=0 V corresponds to the angle q=0, i.e. darkness. At both positive and negative voltages U, transmission increases and reaches a maximum when q=±45°. The same transmission is therefore obtained for positive and negative voltages of equal value. This enables the same image to be recorded alternately with positive and with negative voltage, so that on average no DC voltage component occurs at the cell and consequently no ghost images appear.

In the asymmetrical mode, U=0 V corresponds to an angle of rotation of 22.5°, that is, 50% transmission. A voltage of one polarity (e.g. positive) increases q and consequently increases transmission, whereas the opposite polarity decreases both quantities. For complete switching from light to dark, the range of modulation for q need be only ±22.5°.

The invention combines the advantages of both operating modes without the aforementioned disadvantages. The most important advantage of the invention is that ferroelectric liquid displays can be actuated in "asymmetrical" mode without ghost images forming and, in the case of DHF cells, without large switching angles, which have hitherto been impracticable.

Figure 2:
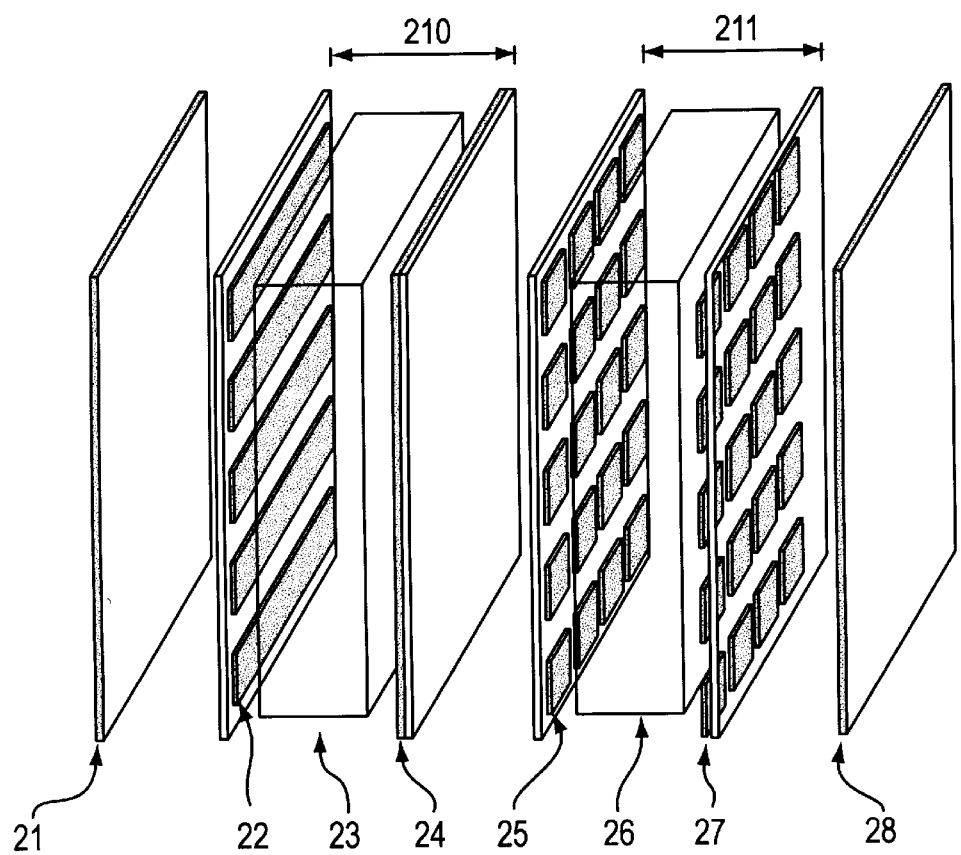
FIG. 2 is a perspective diagram of a DHF cell according to the invention.

FIG. 2 shows an embodiment of the invention in which two DHF liquid crystal cells 210, 211 immediately following one another are disposed between crossed polarizers 21, 28. The liquid crystal cell 210 consists in a known manner of a liquid crystal layer 23 between two substrates, one with line electrodes 22 and the other with surface electrodes 24. This liquid crystal cell is switched one line at a time, at constant amplitude. The liquid crystal cell 211 comprises a liquid crystal layer 26 between two substrates comprising pixel electrodes 25, 27 and actuated with the image information in synchronism with cell 210. FIG. 2 omits orientation layers, electric connections to the LCDs or any active matrix of components of the liquid crystal cell 211.

According to the invention the liquid crystal cells 210 and 211 are so constructed and actuated as to avoid interfering DC voltage components. This is done by changing the polarity of the applied voltages from image to image. One important feature of the invention is that light transmission (the grey scale value) is the same in both these phases.

FIG. 3 diagrammatically shows the orientation and double refraction properties of the two liquid crystal cells 210 and 211 for three grey stages—i.e. light on line 35, grey on line 36 and dark on line 37, in columns 31 and 32 for phase 1 and in columns 33 and 34 for the oppositely actuated phase 2. The polarizer 21 (FIG. 2) is polarized at right angles, i.e. parallel to the major axis, in column 31, whereas the analyser 24 is crossed relative thereto.

The double refraction of the two liquid crystal cells is identical and approximately equal to half the wavelength, i.e. $\Delta n \cdot d = \gamma/2$ with $\Delta n = n_a - n_o$, where $n_{a,o}$ denotes the extraordinary and the ordinary refractive index of the DHF structure, d=cell thickness and γ=wavelength (≈550 nm). The shaded sectors in FIG. 3 show the range of rotation of the optical major axis in electro-optical use; negative voltages (e.g. column 31) rotate the major axis to the left whereas positive voltages (e.g. column 33) rotate it to the right. At an applied voltage of 0 V, the optical major axis is rotated 22.5° clockwise from the vertical in the case of the first liquid crystal cell 210 (columns 31 and 33), and 67.5° anticlockwise in the case of the second liquid crystal cell 211 (columns 32 and 34). In all, the two cells, i.e., e.g. the two directions of rubbing of the orientation layers, are rotated 90° from one another.

FIG. 3 shows directly that transmission in the two phases is identical. In line 35, phase 1, the linear polarized light is not influenced by the first liquid crystal cell 210 (column 31), since it is polarized parallel to the optical axis. The second liquid crystal cell 211 (column 32) acts as a γ/2 plate, that is, it rotates the direction of polarization through 90°, so that light can pass through the analyser 24 without attenuation. In phase 2, the first liquid crystal cell 210 (column 33) acts as a γ/2 plate and the second liquid crystal cell 211 (column 34) does not influence polarization.

In both phases, therefore, light is transmitted without attenuation.

In the other extreme case of minimum transmission (line 37) the double refractions of the two liquid crystal cells balance out, both in phase 1 (columns 31 and 32) and in phase 2 (columns 33 and 34), i.e. transmission between crossed polarizers is at a minimum.

In the general case, that is, grey (line 36), a voltage U2 with |U2|≦|U1| is applied to the second liquid crystal cell 211. In phase 1 the light arriving at the second liquid crystal cell 211 is polarized at right angles, whereas the first liquid crystal cell 210, as before, has no effect on polarization. The optical axis of the second liquid crystal cell 211 is rotated relative to the analyser through an angle α<45° controlled by the voltage U2. This results in transmission proportional to $\sin^2(2\alpha)$. In phase 2, the first liquid crystal cell 210 rotates the polarization through 90° (column 33), which is then horizontal on arrival at the second liquid crystal cell 211. Since in this case the voltage -U2 is applied in phase 2 (column 34), the optical axis is rotated by 45°-α a relative to the analyser, and consequently transmission is proportional to $\cos^2[2(45°-\alpha)]$. "Cos" because the incident light is polarized parallel to the analyser. This however is proportional to $\sin^2(2\alpha)$, i.e. is identical with phase 1.

Since α can take any value between zero and 45° depending on the signal voltage U2, the transmission $\sin^2(2\alpha)$ takes any value between 0 and 1.

Exact positioning of the crossed polarizers or of the two liquid crystal cells is not critical. As FIG. 3 shows, transmission for the dark state (line 37) is at a minimum for any direction of the crossed polarizers, since the double refractions cancel out exactly. In the light state (line 35) the colour may depend slightly on the position of the polarizer. Exact positioning can therefore be used for optimising the colour.

Figure 4:
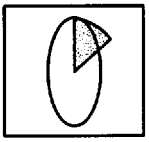
FIG. 4 shows the orientation and double refraction properties of an alternative arrangement.
Figure 4:
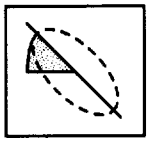
Figure 4:
Figure 4:
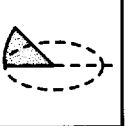
Figure 4:
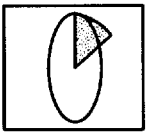
Figure 4:
Figure 4:
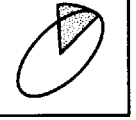
Figure 4:
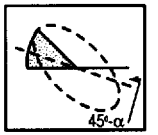
Figure 4:
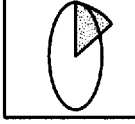
Figure 4:
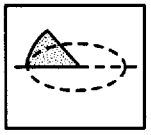
Figure 4:
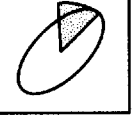
Figure 4:

FIG. 4 shows another possible reciprocal arrangement of the two cells and polarizers. In contrast to FIG. 3, the cells are rotated through only 45° from one another. As a result, in phase 1 in the dark state (line 47, columns 41 and 42) the phase shifts are added instead of compensating one another as in FIG. 3. If however the polarizers are oriented parallel and at right angles to the resulting major axis, transmission is at a minimum.

As will be evident to a person skilled in the art, other configurations having a similar effect are possible, more particularly when using thicker birefringent cells with $\Delta n \cdot d = \gamma$ or $\Delta n \cdot d = 3\gamma/2$.

Application of the invention is not restricted to DHF cells, although they are particularly preferred. Periodic changing of polarization is advantageous also in the case of SSF liquid crystal displays, as a means of avoiding ghost images and switching delays in these displays also.

We claim:

1. A ferroelectric liquid crystal display comprising:
   (a) two polarizers, and
   (b) two liquid crystal cells capable of transmitting light, disposed one behind the other between the two polarizers, each liquid crystal cell comprising:
      (i) two transparent substrates,
      (ii) two transparent electrodes, each fitted to a transparent substrate, one electrode of one of the liquid crystal cells being a line electrode and one electrode of the other of the liquid crystal cells being a pixel electrode, and (iii) a liquid crystal layer disposed between the two transparent electrodes and having a helical structure which is influenced by the action of an electric potential, the helix having its axis parallel to the transparent substrates at an electric potential of 0 V and, upon application of a positive or a negative electrical potential, a major axis of a refractive index ellipsoid, wherein upon application of the positive or the negative electrical potential, the angle between the axis of the helix and the major axis of the refractive index ellipsoid never exceeds ±22.5°, and wherein substantially the same light transmission is obtained for each liquid crystal cell upon application at the same time of a positive electric potential of a given value to one of the liquid crystal cells and a negative electric potential of equal value to the other liquid crystal cell.

2. A liquid crystal display according to claim 1, wherein the two liquid crystal cells are DHF displays.

* * * * *